INVENTORS
William L. Sones
George A. Neyhouse
James O. Elliott
BY

Their Attorney

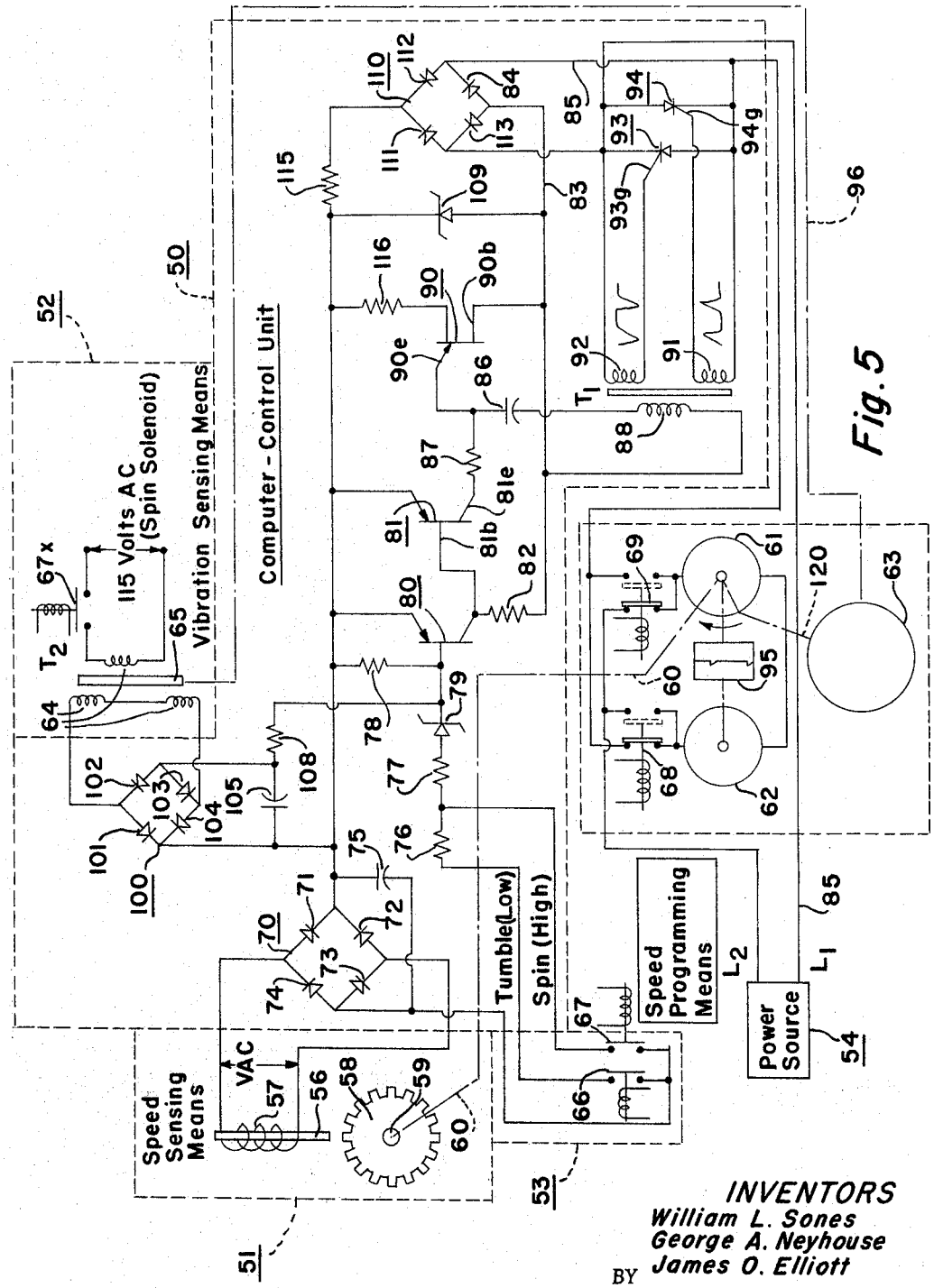

Aug. 9, 1966     W. L. SONES ETAL     3,265,948

MACHINE CONTROL SYSTEM

Filed Aug. 31, 1964     6 Sheets-Sheet 4

INVENTORS
William L. Sones
George A. Neyhouse
BY James O. Elliott

Their Attorney

INVENTORS
William L. Sones
George A. Neyhouse
BY James O. Elliott

Their Attorney

INVENTORS
William L. Sones
George A. Neyhouse
James O. Elliott
Their Attorney

United States Patent Office 3,265,948
Patented August 9, 1966

3,265,948
MACHINE CONTROL SYSTEM
William L. Sones and George A. Neyhouse, Dayton, and James O. Elliott, Xenia, Ohio, assignors to General Motors Corporation, Detroit, Mich., a corporation of Delaware
Filed Aug. 31, 1964, Ser. No. 393,264
12 Claims. (Cl. 318—227)

This invention relates to a performance control system having precise speed regulation regardless of load, and to circuitry disclosed broadly by co-pending application Serial No. 159,015—Sones et al. filed December 13, 1961, now abandoned, and of which this is a continuation-in-part, referring herein more particularly to application of continued principles for alternating current system control of an A.C. induction or synchronous type motor means having a short circuited rotor portion.

Change of speed of an A.C. motor means with a short-circuited rotor portion has been a problem for which solution is sought to permit more economical use of an A.C. induction-type rather than universal motor or direct current motor means. Switching problems are also avoided without use of resistance or rheostat means as well as tapped chokes and the like previously encountered for other speed control systems. Now it is possible to obtain infinite speed control of an A.C. induction motor by control of voltage accompanied by torque control integrated for operating speed maintained at any predetermined value represented on curves showing speed-torque characteristics. Thus circuitry is provided including components adapted for sensing one or more conditions subject to correction while an A.C. induction motor means operable therewith is governed accordingly as to speed and the like.

An object of this invention is to provide a new and improved system sensitive to one or more variable parameters exemplified by conditions of vibration, temperature, humidity, light, variable speed cycle programming and other factors as may be encountered by vehicles, appliances and articles of manufacture powered by an A.C. induction motor means.

Another object of this invention is to provide control of voltage supplied to A.C. induction motor terminals with static circuitry to proportion voltage signalling at each half cycle integrating sensed conditions for A.C. induction motor operation with selective speed programming while avoiding moving parts other than short-circuited rotor portions of A.C. induction motor means per se.

Another object of this invention is to provide a static computer-control unit for use with an A.C.-induction motor means to drive electrically motorized equipment such as vehicles, appliances, winding apparatus, paper slitting devices and the like and including a static magnetic amplifier means through which line voltage is supplied to an A.C. induction motor means. The speed thereof is governed by reference signals to which the magnetic amplifier means responds from sensed variable conditions such as temperature, humidity, degree of cleanliness, load vibration, motor output speed and the like. This is accomplished by severally utilizing, for example, one signal as a reference signal opposed to which there is obtained a tachometer signal which is proportional to speed. An algebraic sum of these signals can determine the output speed of the A.C. induction motor means. Also a third signal can come from a differential transformer means transmitting electrical energy proportional to amount of vibration to allow proportioning of all of these signals to the magnetic amplifier means, in effect, to "compute" and "control" supply of line voltage for operation of the A.C.-induction motor means at a correspondingly safe running speed of operation.

A further object of this invention is to provide a static computer-control unit for use with an A.C.-induction motor means to drive electrically motorized equipment such as vehicles, appliances, winding apparatus, fabric slitting devices and the like. There is included a static semiconductor circuit means having components such as transistors, silicon-controlled-rectifier (SCR) devices and the like through which line voltage is supplied to A.C.-induction motor means having speed thereof governed by reference signals sensed to represent variable conditions such as temperature, moisture content, degree of cleanliness, acceleration, pressure, velocity, vibration amplitude and the like. There is accomplished a motor speed control over a wide range, the various signals being used in semiconductor switching and rectified supply of power under regulation to adjust A.C.-induction motor voltage for at least a portion of every half cycle of power supplied.

Another object of this invention is to provide an electrical computer-control unit for use with a pair of motor means one of which is small and operable at variable frequency for speed variation and the other of which is heavy to provide considerable torque for generally continuously accelerating a load. The motor means will be subject to electronic speed control during this time and can be selectively energized in a program of predetermined cycle of operation for running free of such electronic control. The smaller motor means also is subject to maintenance of constant speed for a predetermined range by electronic control which as a unit includes a magnetic amplifier means, semi-conductor amplifier means and the like in a circuit for supply of line voltage to govern speed of an A.C.-induction motor means and sensitive to variables such as conditions of speed of the A.C.-induction motor means, of vibration in a motor-driven load, and of selective speed programming. There is avoidance of moving parts other than in the motor means per se so as to proportion multiple signals as to the conditions to utilize these signals for motor operation at any present speed so long as that speed is safe.

Further objects and advantages of the present invention will be apparent from the following description, reference being had to the accompanying drawings wherein preferred embodiments of the present invention are clearly shown.

In the drawings:

FIGURE 5 is a circuit diagram of a computer-control unit having semi-conductor components for use in accordance with the present invention.

Electrical power available for operation of motorized articles of manufacture such as appliances and the like is generally A.C. rather than D.C., particularly since transmission of A.C. power over supply lines is more practicable. Various types of electrical machines are used for operation of appliances such as laundry equipment including washing machines and dryers and generally when permanent capacitor motors or induction A.C. motors are utilized various approaches have been used for multiple speed operation thereof. Sometimes a complicated transmission or gear reduction is provided or a feedback-type circuit is used with A.C. motors to provide stable speed control since such control manually is difficult to achieve. During operation of such an A.C. motor for powering appliances as well as other machinery, it can also be stable so far as speed control is concerned by use of features in accordance with the present invention relating to a servo-like control to hold operating speed at predetermined values in accordance with sensing of variable parameters such as conditions of vibration, temperature, humidity, light variable speed cycle programming and the like in conjunction with the tachometer feedback arrangement. Such variable conditions can be encountered even on motorized vehicles where conditions sensed can be not only vibration, temperature, etc. but also conditions as to direction of operation of an air-borne object, for example, which is to be propelled in a specific flight path and which is to be controlled as to speed of operation subject to correction of any deviation from such flight path.

Figure 1:
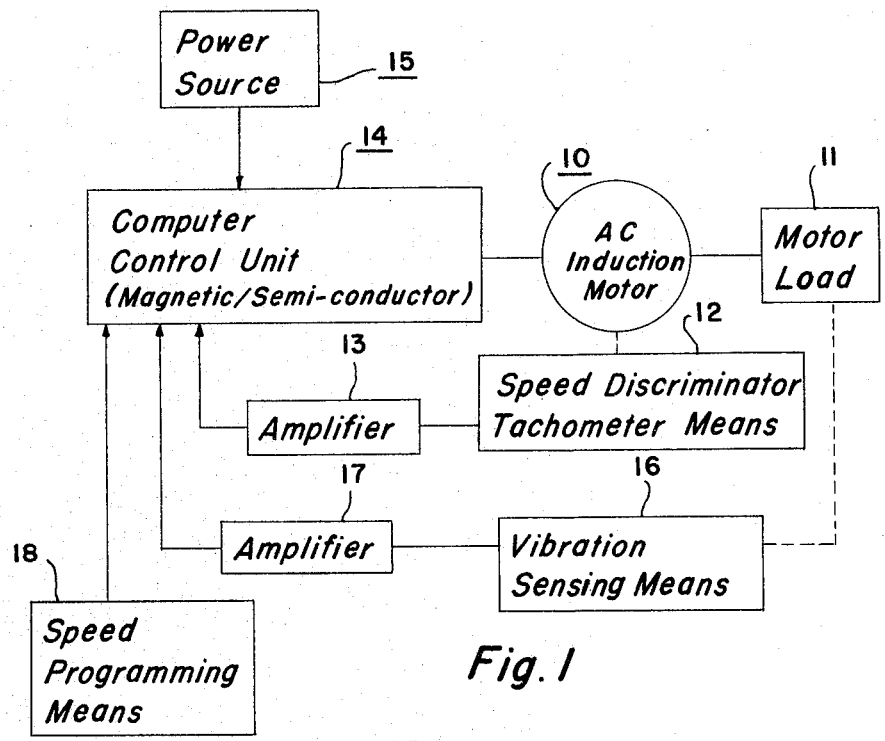
FIGURE 1 is a block diagram representing a machine control system in accordance with the present invention.

FIGURE 1 illustrates in a block diagram use of an A.C.-induction motor means generally indicated by numeral 10 for driving a load 11. This load, for example, could be a clothes drum on laundry equipment such as a dryer or washing machine in which distribution or tumbling of the load materials can result in unbalance as well as vibration as well as other variable conditions of operation including, for example, changes in temperature and/or humidity as well as differences in cleanliness of articles in the load. The block diagram of FIGURE 1 provides for sensing of certain of these conditions and it is to be understood that additional sensing equipment can be provided for supply of signals which in turn can be used for control of power supply to the A.C.-induction motor means 10 subject to an integration or computing of performance limits available from the A.C.-induction motor means for a predetermined set of such conditions. Differences in the amount of load such as the weight of clothes, for example, can require differing output torques from the motor means 10 and output speed of the A.C.-induction motor means 10 can vary in accordance with loading. Therefore, an indication or measurement of speed of the A.C.-induction motor means 10 can be used as one variable condition to signal operation and performance possible and a speed discriminator or tachometer means 12 can be provided with suitable mechanism to convert speed of operation into electrical signals which optionally can be strengthened if necessary by an amplifier 13 and fed by a line or load means to a computer-control unit generally indicated by numeral 14 and having static electrical circuit components adapted for metered supply of power from a source generally indicated by numeral 15 at a frequency such as sixty cycle input at differing voltage values to effect operating speed of the A.C.-induction motor means 10.

As noted earlier, the load such as 11 powered by the A.C.-induction motor means 10 can vary so as to encounter conditions of unbalance and accompanying vibration which may become excessive and which may exceed a desirable value. Accordingly, a vibration sensing means indicated by numeral 16 can be provided to convert mechanical impulses of vibration into electrical signals which can be strengthened by use of an amplifier 17, if necessary, for supply thereof to the computer-control unit 14.

A particular operation being performed on a motor load such as 11 can require various settings as to speed of operation desired including, for example, differences in running speed required for tumbling a laundry load as compared with a higher speed of spinning such a laundry load for drying purposes and the like. Therefore the block diagram of FIGURE 1 includes provision for a speed programming means 18 which can be manually as well as automatically set to signal a particular phase or mode of operation desired. However, it is to be understood that conditions of loading as well as conditions of the variable parameters such as vibration, temperature, etc. can be such that actual operation at such a desired speed of programming can be realized only once such abnormal variable conditions have been subjected to correction such as by suitable supply of balance by addition of fluid medium such as water into tanks or reservoirs surrounding the drum as well as other provision for balance of a particular load. At least one of the variable conditions will be encountered so far as multi-speed motor control and operation is concerned and accordingly, features of the present invention as described will include description as to one or more of such variables affecting use and operation of a control system for machine operation in accordance with the present invention. It is to be understood that differing variable conditions can be sensed and converted into control signals depending upon the type of motorized machine on which features of the present invention are provided.

The computer-control unit 14 in accordance with the present invention can utilize magnetic amplifier means as well as semi-conductor means as an electrical speed control in a servo-like operation. The illustration of FIGURE 2 discloses a series system of magnetic amplifier means for supply of electrical power to an A.C.-induction motor means generally indicated by numeral 20. This A.C.-induction motor means 20 can be used to drive a load (not shown in FIGURE 2) of a type similar to the load 11 mentioned with the block diagram of FIGURE 1. A suitable source of A.C. power can be provided and this is indicated by a reference numeral 21. To provide an example of a variable condition in the circuit of FIGURE 2 there is a connection across the supply lines from the source 21 to a speed programming means 22 which can be in the form of a timer or clock-like device adapted to be set for various modes of operation for predetermined intervals of time or adapted to follow a predetermined path or sequence of settings for various desired speeds of operation. It is to be understood that such a sequence of various speeds of operation as determined by the programming means 22 can coincide with predetermined electrical signals of differing magnitude in accordance with a partciular speed of operation desired. These speed signals from the programming means 22 can be converted by bridge rectifier means 23, 24, 25 and 26 into a direct current impulse or signal which is transferred by lead wire or line connections to a saturable reactor means including a D.C. winding 27 as well as a pair of A.C. windings 28. These A.C. windings or coil portions 28 of the saturable reactor are connected in series with each other in one supply line from the source 21 and for purposes of speed control of the A.C.-induction motor means 20 these A.C. windings 28 of the saturable reactor or magnetic amplifier means can have a variable impedance or inductive reactance for limiting power supplied to the A.C.-induction motor means 20. When no current flows in the direct current winding 27 the A.C. windings or reactor coil portions 28 have a large impedance or inductance and act as a "choke" preventing the flow of much alternating current therethrough to the A.C.-induction motor means 20. Use of a small direct current signal can control operation of the A.C.-induction motor means 20 requiring passage of much larger A.C. power thereto. The supply of A.C. voltage applied to the A.C.-induction motor means 20 for purposes of speed control can be increased or decreased according to variation of D.C. signals from the speed programming means 22. For example, even a few milliamperes of direct current flow through many turns of the D.C. winding 27 can effect saturation of an iron core therewith such that inductive effect thereof is reduced and the A.C. winding means therewith can be less able to prevent A.C. power to be supplied to the A.C.-induction motor means 20. Variation in the impedance or inductive reactance of the A.C. winding means 28 will result in differing voltage drops thereacross and a decrease in such impedance will result in decrease of voltage drop thereon for supply of greater voltage to the A.C.-induction motor means 20 which can then operate at a greater speed.

Figure 2:
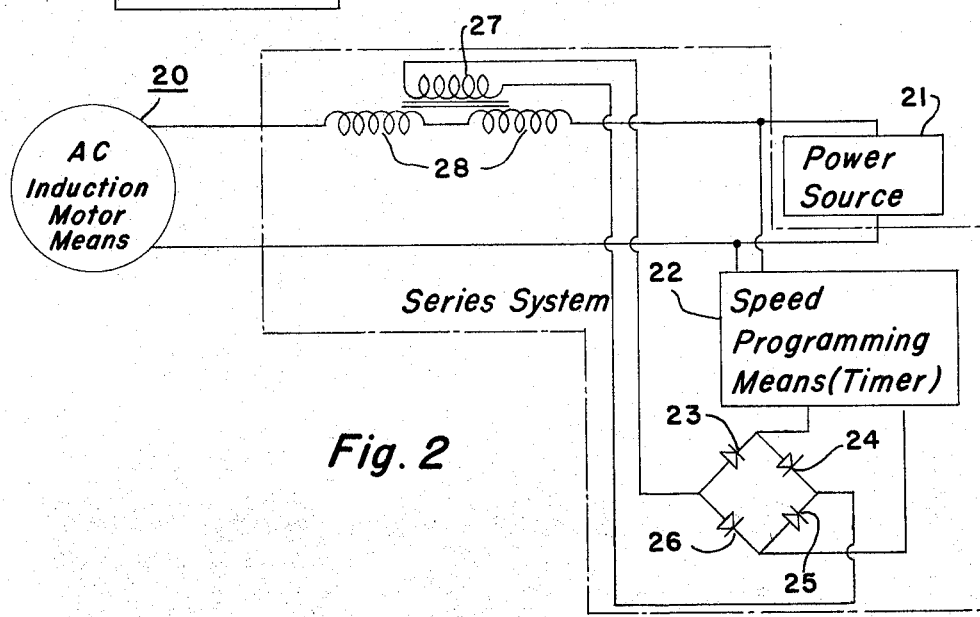
FIGURE 2 is a circuit diagram of a saturable reactor series system having features for use in accordance with the present invention.
Figure 3:
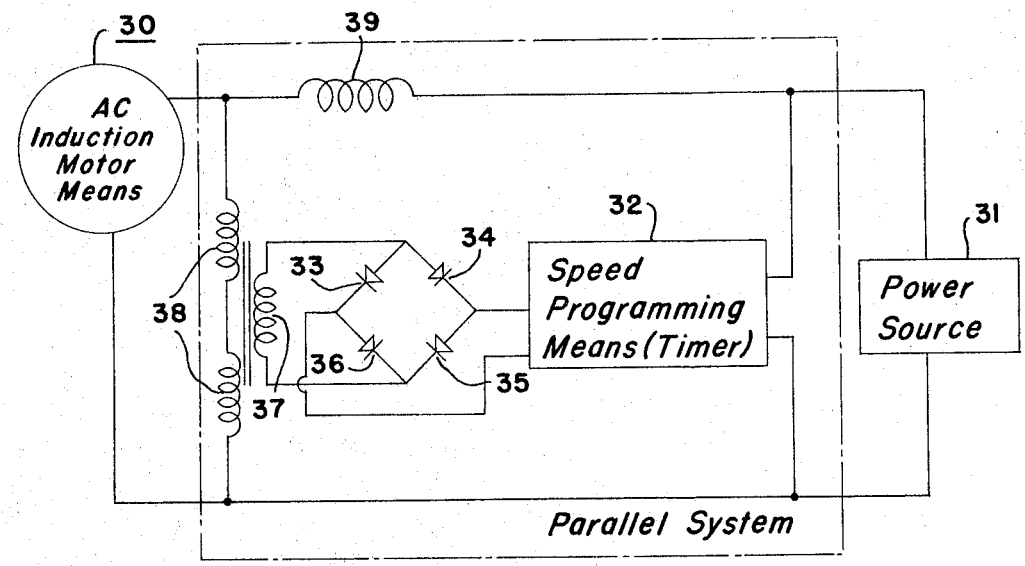
FIGURE 3 is a circuit diagram of a saturable reactor parallel system having features for use in accordance with the present invention.

FIGURE 3 illustrates a parallel system of computer control unit means for variation in voltage supplied to an A.C.-induction motor means 30 from a power source 31. A speed programming means 32 is connected across the supply line from the source 31 and bridge-connected rectifier means 33, 34, 35 and 36 can convert A.C. speed programming signals to direct current for supply to a D.C. winding means or portion 37 of a magnetic amplifier means also including A.C. winding means reactor coil portions 38. The A.C. winding means or reactor coil portions 38 are also connected across the supply lines from the source 31 except that in series with one of these supply lines there is a choke or impedance means such as a coil means 39 in series to absorb the line voltage when the saturable reactor is shunting the A.C.-induction motor means 30. The saturable reactor or magnetic amplifier means including the D.C. winding 37 and A.C. winding means 38 as used in the parallel system is such that a D.C. current flowing in the D.C. winding 37 can increase the amount of A.C. current permitted to flow through the A.C. winding means 38. Thus, in response to an increase in D.C. current through the D.C. winding means 37 of the saturable reactor or magnetic amplifier means there will be less impedance or inductive reactance through the series connected winding means or A.C. winding means or reactor coil portions 38 and in increments the voltage drop increases across the A.C. winding means 38 such that less current or power is supplied to the A.C.-induction motor means 30 whenever there is an increase in D.C. current supplied through rectifier means from a variable parameter or conditions such as speed programming and the like. The views of FIGURES 2 and 3 illustrate application of saturable reactors or magnetic amplifier means as a static speed control for an A.C.-induction motor means.

Figure 4:
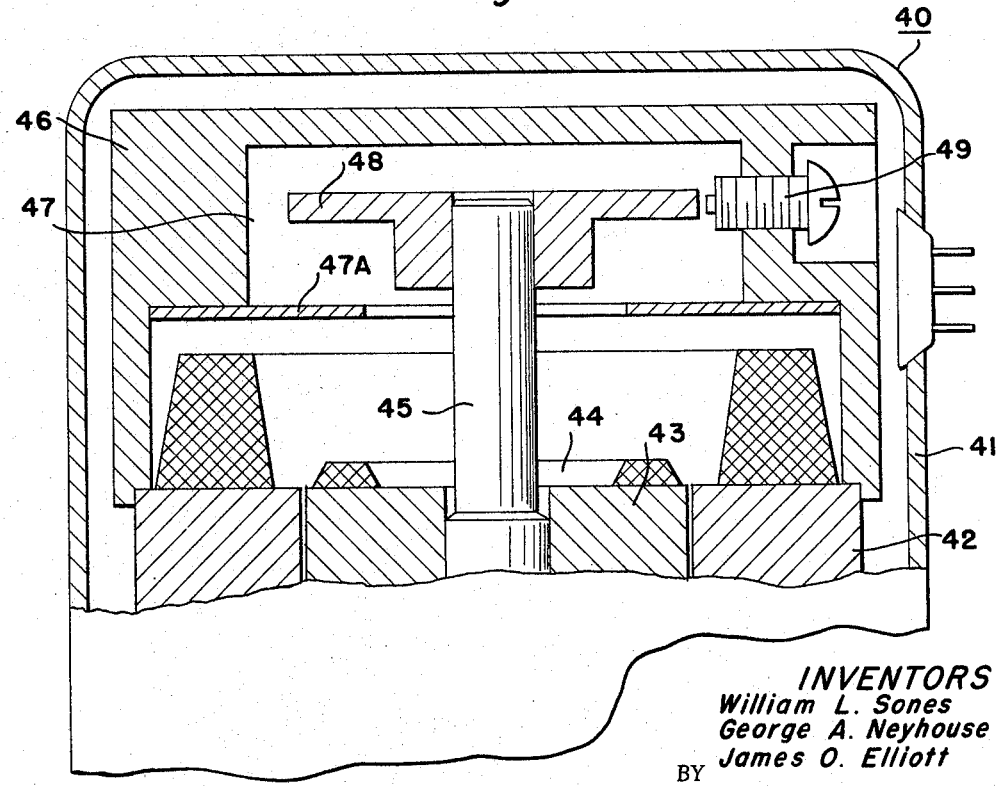
FIGURE 4 shows a partially sectioned view of a hermetically sealed refrigeration or air-conditioning compressor A.C.-induction motor means having an internal speed sensing portion for use with external speed modulation control in accordance with the present invention.
Figure 5A:
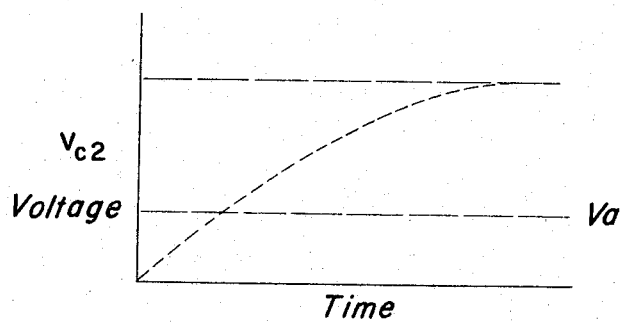
FIGURE 5A illustrates voltage charge on a timing capacitor means in the circuit of FIGURE 5.

FIGURE 4 shows a partially sectioned elevational view of a heremetically sealed A.C.-induction-motor-compressor means generally indicated by numeral 40, with a housing 41 and a wound motor stator 42 carried therein. A squirrel-cage or shorted-winding rotor means 43 having cast metal end ring portions 44 in a well known manner is carried on a shaft 45 suitably journalled as to the housing and stator. Secured to one end of the stator 42 and internally of the housing there is an annular auxiliary end portion 46 having a space 47 closed off by a plate or disc 47A centrally apertured for passage of the shaft 45 having an end extending into the space 47. A toothed wheel means 48 is secured to this end of the shaft 45 and is radially in alignment with a speed sensing means or pickup 49 mounted through the auxiliary end portion 46 as shown in FIGURE 4. The wheel means 48 and pickup 49 are comparable to components designated by references 58 and 56 respectively in FIGURE 5. The structure of FIGURE 4 can be used to apply speed control features for refrigeration and air-conditioning motor-compressor installations wherein the speed sensing signal means is located inside a sealed motor-compressor shell and speed is controlled from an external position.

It is to be noted that in the circuits of FIGURES 2 and 3 the rectifier means can be made of selenium, copper oxide, silicon and the like materials depending upon the power ratings required. It is to be understood that various conditions or variable parameters can be sensed and signals accordingly fed to the computer control unit such as 14 illustrated in FIGURE 1 and that preferably static means are used in the control system so as to avoid moving parts except for those in the motor means per se. The A.C.-induction motor means can be connected to drive a load in any suitable manner and for example, the motor means can be provided with suitable pulleys to permit belt connection directly to the laundry appliance tub or drum also having a pulley therewith. Motor speed is servo-controlled for variation by altering the voltage on the motor means as power is supplied from a source by line connections through a magnetic amplifier means as noted. This magnetic amplifier means can respond to several control signals, one of which can be a reference signal with a tachometer signal proportional to speed being opposed to the reference signal. An algebraic sum of these signals can determine output speed of the system. It is also possible for a third signal to come from a differential transformer system and this third signal can be proportional to amount of vibration in the system. A proportioning of the three signals can allow laundry equipment such as a washing machine, for example, to run at any present speed so long as that speed is safe so far as conditions of unbalance and corresponding vibration are concerned. Further details as to sensing of tachometer and vibration conditions can be seen in the illustration of FIGURE 5 which discloses use of semi-conductor devices as amplifiers for servo speed control further in accordance with the present invention.

In the computer-control unit of FIGURE 5 as in the system of FIGURE 1, there is provision for sensing three differing variable conditions for use in effecting proportioning of an alternating current signal for speed control of a motor means. The circuit of FIGURE 5 provides refinements having specific purposes in proper operation of a motorized appliance means such as laundry equipment including a clothes dryer and/or washing machine. It is to be noted that these refinements as well as the circuits in any of the views of the drawings of this disclosure can be used for centrifuging or spinning apparatus generally for industrial as well as domestic uses. Industrially, features of the present invention could be used during sugar refining operations where distribution of an uneven load is required accompanied by balancing thereof. Also the speed control system for A.C.-induction motor operation in accordance with the present invention can be used for refrigeration and air-conditioning installations having both compressor and fan units therewith. The features of the present invention can also be applied for furnace blower modulation and attic fan control. The illustration of FIGURE 5 is representative of one type of installation.

The major sections of the machine control system having static semi-conductor means therein can be seen in the view of FIGURE 5. In the example given by this illustration of the drawings the computer-control unit identified generally by numeral 50 receives information from three sources such as a speed discriminator or speed sensing means generally indicated by numeral 51, a vibration discriminator or vibration sensing means generally indicated by numeral 52 and a program signal or speed programming means generally indicated by numeral 53. It is to be noted that variable conditions other than these just mentioned can be transformed into electrical impulses or signals which can be supplied to a computer-control unit such as 50 and such other conditions can include temperature, humidity and the like as may be encountered for differing uses and environments. The computer-control unit 50 determines power applied to a load from a source generally indicated by numeral 54. The power supplied or applied to the load in terms of alternating voltage can be in accordance with impulses or signals representing conditions of speed, vibration and programming as well as other parameters. When the load is operated at a condition wherein excessive vibration occurs, the computer-control unit includes circuitry and components to effect lowering of A.C. voltage applied to the load so as to reduce speed thereof until the vibration situation has been subjected to correction as in the case of a self-balancing machine or other balancing provisions therewith. For speed variations due to loading, line voltage, and the like, the computer-control unit can effect lowering and raising of motor voltage as required to maintain a constant speed. The machine control system in accordance with the present invention permits control of speed over a wide range of speeds on A.C.-induction motors. Provisions for sensing variable parameters as well as components of the computer-control unit 50 are set forth in further detail including reference to features of FIGURE 5.

The speed discriminator section or speed sensing means generally indicated by numeral 51 can have a permanent magnet pickup means similar to a type used on dynamometers and including a number of turns of wire 57 wound on the small magnet 56 as shown in a portion of the view of FIGURE 5. This permanent magnet pickup means 56 is located radially in alignment adjacent to an outwardly toothed wheel means 58 suitably journalled on a shaft 59 driven by a connection 60 to an A.C.-induction motor means or load 61. The motor means 61 can drive or effect spinning of centrifugal load means as can a secondary A.C.-induction motor means 62. The centrifugal load is indicated by reference numeral 63 and it is to be understood that this load 63 can be caused to rotate due to action of one A.C.-induction motor means as well as a pair or more of motor means depending upon particular functions and operations to be performed on the load. As the toothed wheel means 58 rotates, the permanent magnet pickup means 56 is subjected to varying air gaps and effective reluctance change causes flux changes in the magnet so as to induce a voltage in the coil or wire means 57. This voltage varies both in frequency and amplitude depending on the speed of the wheel means 58.

The vibration discriminator or vibration sensing means 52 includes a differential transformer means 64 having a movable core or member 65 mechanically connected to a loading point of interest or centrifugal container or tub. The vibration of the centrifugal load, container or tub and the like is transmitted to the movable member 65 which serves to pick up mechanically disturbances or vibration in the load 63. For both the speed sensing means and the vibration sensing means there can be provided a full-wave bridge means and capacitive filter unit each for transfer of "speed" or "unbalance signal" to be fed into the computer-control unit 50. Further reference to the bridge and filter unit portions will be provided in the description of the operation of the computer-control unit 50.

The program selector section or speed programming means 53 can include solenoid-operated switch means 66 and 67 and adapted to have an arm thereof bridging contacts for either low or high speed operation, respectively. In the low speed actuated position the switch means 66 can result in a tumble-like operation and simultaneous energization of a low speed or four-pole tumble motor means 62 by way of a double-pole double-throw switching means 68 also solenoid operated in accordance with positioning of the switch means 66. This double-pole double-throw switching portion 68 for energization of the tumble motor means or low speed four-pole means 62 can be tied to a further double-pole double-throw switching portion 69 effective for energization of the spin or high speed motor means 61 which can have a two-pole arrangement, for example. The spin switching means 67 of the program selector or speed programming means 53 also energizes the vibration discriminator or vibration sensing means during high speed or spin cycle operation and a supplemental or auxiliary solenoid-operated switching portion 67x is provided to connect the vibration discriminator or sensing means to a power source such as 54 during spin cycles while a centrifugal load such as 63 is driven by a suitably selected motor means.

Figure 6:
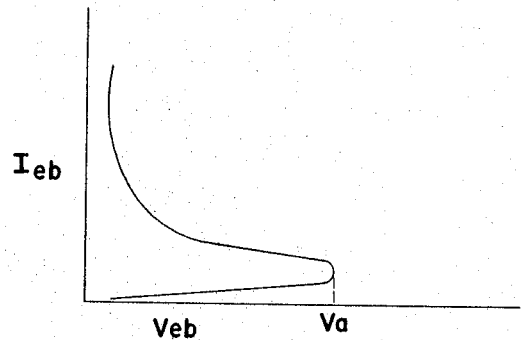
FIGURE 6 illustrates input characteristics for a uni-junction semi-conductor means in the circuit of FIGURE 5.

The computer-control unit 50 includes a first bridge portion generally indicated by numeral 70 having rectifiers 71, 72, 73 and 74 therewith for conversion of A.C. signal voltage from the coil or wire portion 57 of the speed sensing means 51 into full-wave direct current in a D.C. signal that is filtered by a capacitance means 75 for application of this signal through a network of components including resistances 76, and 77 and 78 as well as a Zener diode or rectifier tube 79 having two elements such as an anode and cathode. The resistance means 76 and 77 serve to limit current flow for tumble (low) or spin (high) speed operation as series connected in accordance with actuation of the switch means 66 and 67, respectively of the speed programming means 53. The resistance means 78 is adapted to be in series with one or more of the resistance means 76 and 77 as well as the Zener diode 79 such that a voltage drop across the resistance means 78 can occur only when an impulse or signal for speed sensing is rectified by the first bridge portion 70 and filtered by the capacitance means 75. The resistance means 78 in addition to being in series with the further resistance means and Zener diode 79 (optional) has a connection across the input terminals of a semi-conductor device generally indicated by numeral 80. It is to be noted that input terminals of a further or second semi-conductor device generally indicated by numeral 81 are connected directly across output terminals of the first semi-conductor device 80. For zero voltage across the input terminals of the first semi-conductor device 80 when there is no current flowing through the resistance means 78 due to lack of current flow therein from the first bridge means 70 and speed sensing means 51, the first semi-conductor device 80 will be effectively open causing the further or second semi-conductor device 81 to conduct from emitter $81e$ to base $81b$ through a resistance means 82 and a circuit connection 83 to a rectifier 84 to a power supply line 85. Simultaneously with this base current flow through the second semi-conductor device 81 there is a condition or effective shorting across the output terminals of the second semi-conductor device 81 allowing capacitance means 86 to charge through a resistance means 87 and a primary portion 88 of transformer means $T_1$. The capacitance means 86 will build up a charge $C_2$ to a voltage $Va$ as shown in a chart or graph in FIGURE 5A. An unijunction semi-conductor means or transistor means generally indicated by numeral 90 connecting emitter $90e$ to base $90b$ across the capacitance means 86 has an input characteristic of voltage $Veb$ to a peak voltage $Va$ at a current $Ieb$ as shown in FIGURE 6.

Figure 6A:
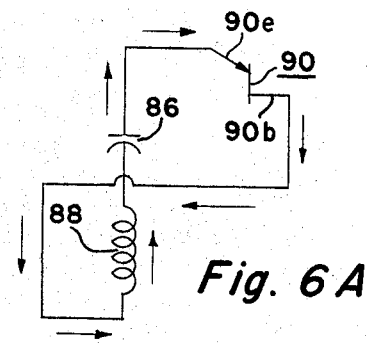
FIGURE 6A illustrates a portion of the circuit of FIGURE 5 through which the voltage represented in FIGURE 5A is discharged.

For a given peak voltage "$Va$," impedance of a path from emitter $90e$ to base $90b$ drops very rapidly toward zero furnishing capacitance means 86 with a low impedance discharge path through the semi-conductor device or unijunction transistor means 90 and primary portion 88 of the transformer means $T_1$ as represented in FIGURE 6A. This quick discharge of the capacitance means 86 produces a pronounced or sharp peak of voltage across the primary portion 88 of the transformer means $T_1$ which is magnetically induced in secondary coils 91 and 92 of the transformer means $T_1$. These secondary coil portions 91 and 92 of the transformer means are connected such that positive leads thereof are connected respectively to the gates of semi-conductor devices or rectifier means generally indicated by numerals 93 and 94, respectively. Each time that capacitance means 86 discharges through the semi-conductor or unijunction transistor means 90 and primary portion 88 of the transformer means T₁ there will appear a positive pulse or sharp increase of voltage at each of the gates 93g and 94g of the semi-conductor means 93 and 94 which preferably are silicon-control rectifier (SCR) devices. Such SCR devices per se are commercially available and can carry heavier current than transistor means though both can be generally classified as static semi-conductor means. Each semi-conductor or solid state unit includes a gate for SCR or base electrode for transistor as well as a cathode for SCR or emitter for transistor electrodes and an anode for SCR or collector for transistor electrodes. As a condition prevails instantaneously wherein a small current from a signal or impulse to a gate or base of a semi-conductor means there is a passage or current flow through a control-junction material of an SCR or transistor device which serves as a switch that is closed once such small current flows through the layer of control-junction material to create a bridge that permits a much larger current flow through output terminals of such a semi-conductor device. Each semi-conductor device is a switch-like rectifier as good as the best diodes though serving as a control capable of throttling considerably greater power. Adequate heat sink mounting can be readily provided with cooling fins from which dust can be blown when necessary as determined by visual inspection though no further maintenance is generally required. Since there is no filament to burn out an nothing to deteriorate in semi-conductor devices, they last indefinitely and efficiency is such that losses are only a small fraction of those in a conventional thyratron tube. There is sharp on-off operation and instant start of conduction in a switch-like operation since semi-conductor devices have no filament requiring warm up. Physical size of semi-conductor devices is relatively small so that a minimum of space is required thereby.

The main silicon semi-conductor portion of each such device has antimony and aluminum elements grafted thereto to form an SCR. The typical SCR device has a wafer-like sandwich of silicon one-tenth to one-half inch across and 0.010 inch thick. Electrical contact with one face (the cathode or emitter) of the sandwich is made through a layer of gold antimony with the other (the anode or collector) through a wafer of aluminum. A third contact (the gate) is made with the top layer of the silicon itself. With no voltage on the gate, the silicon sandwich acts as an insulator and prevents flow of current in either direction between the cathode and the anode. As soon as the gate terminal or base is made electrically positive and the cathode or emitter negative, a few thousandths of an ampere can flow through the gate circuit thereby triggering and permitting larger current flow as the condition of the silicon is changed from an insulator into a conductor. If the anode is electrically positive, the current will flow from the cathode to the anode and as long as the anode to cathode voltage remains high enough to keep a holding current flow, the SCR device will continue to conduct regardless of gate voltage. Once current drops below a predetermined holding current value, the semiconductor becomes an insulator again and when voltage is reversed such that the cathode is positive and the anode negative, no current can flow regardless of gate voltage. Therefore, the SCR semi-conductor device is a rectifier capable of conducting or switching heavy currents controlled by a few milliamperes of trigger current. This function is similar to that of a thyratron tube with the advantage that the static SCR devices are unaffected by dust, corrosive fumes, moisture, noise, vibrations, and the like. Use of proper cooling and heat sink provision can assure long and durable service without operating beyond the temperature of 100° to 150° C. above which overheating would occur which could damage or impair and cause failure of the SCR devices. Moisture can be effectively sealed out of the semi-conductor devices commercially available and thus use thereof is particularly advantageous. Thus, if voltage across anode to cathode of the SCR device is such as to allow firing of either of the semi-conductor devices 93 or 94, that particular SCR or semi-conductor device will fire or switch to the on or conducting condition.

Figure 7:
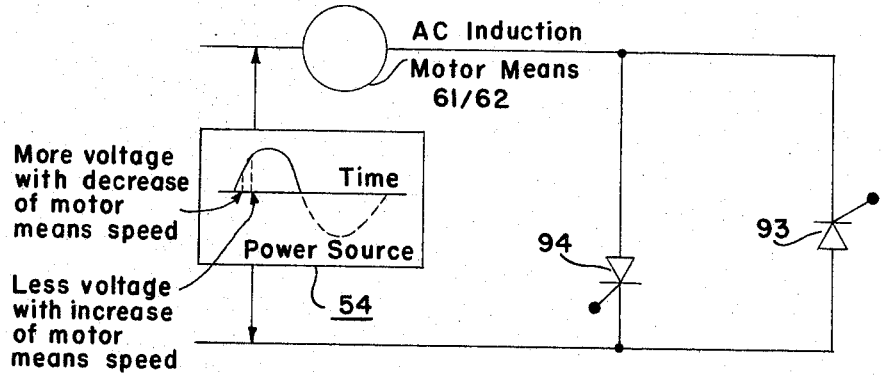
FIGURE 7 illustrates another portion of the circuit of FIGURE 5 utilizing semi-conductor or silicon-controlled rectifier means for use in accordance with the present invention.

As soon as the semi-conductor or SCR device 93 has switched on as represented in FIGURE 7, there is a path for line voltage to reach motor means such as 61 or 62. Assuming the line voltage to consist only of one-half of its actual sinusoidal or actual cycle as represented in FIGURE 7, it is noted that for purposes of illustration that this voltage can be positive or in the forward direction of the semi-conductor or SCR device 93. If this semi-conductor or SCR device 93 is "on" it may be considered a normal diode and would pass current in this direction limited only by the impedance of the motor means. A remaining half of this cycle as represented by dotted lines in the view of FIGURE 7 represents line voltage applied while the semi-conductor or SCR device 94 is "on" while the semi-conductor or SCR device 93 is "off." It is to be understood that in place of a pair of SCR devices 93–94 it would be possible to use either one of these SCR devices alone with a more inexpensive and conventional rectifying means substituted for the other thereof.

Returning to FIGURE 5, operation of the computer-control unit in accordance with the present invention can be further understood by assuming a speed decrease in the motor means under control. The speed discriminator or speed sensing means 51 operates in combination with at least one of the motor means. The connection 60 to the spin motor means 61 is illustrated in FIGURE 5 because in a centrifuging device it is generally the high speed operation which is important and thus this is the speed that is sensed. However, it is to be noted that in FIGURE 5 there is a provision for a one-way overriding clutch means 95 such that the tumble motor means and spin motor means will operate to drive a centrifugal load means 63 up to a predetermined speed of joint operation and during a transition period until the spin motor means 61 operates considerably faster than the tumble motor means and the spin motor means overrides the tumble motor means so as to have the spin motor means exclusively driving the centrifugal load means 63. Assuming a speed decrease in the spin motor means 61 under control, there is a decrease in output signal from the speed discriminator or speed sensing means corresponding to a decrease in speed of the motor means. This reduction in the output signal or voltage of the speed sensing means 51, in combination with the motor means and computer-control unit, is passed along through the first rectifying bridge means 70 and capacitance means 75 so that input terminals of transistor or semi-conductor means 80 have a corresponding reduction in voltage applied thereto which would cause the collector current of the transistor or semi-conductor means 80 to decrease while voltage across the output terminals of the transistor or semi-conductor means 80 rises. As the voltage across the output terminals of the first semi-conductor means 80 increases, the current through the second semi-conductor means 81 increases thereby allowing capacitance means 86 to charge at a faster rate and to reach the voltage Va at a faster rate. This means that a positive gate signal would be transmitted to the first semi-conductor or SCR device 93 by way of the transformer means including coil portions 88 and 91–92 at an earlier time than previously and that the SCR devices 93–94 could fire at an earlier time so as to increase the amount of line voltage applied to motor means thus causing the speed of the motor means to rise. Similarly, an increase in speed of the motor means will result in a smaller or lesser voltage on the motor means. Since this type of regulation adjusts motor voltage for every half cycle of power supply it is possible to obtain speed control at intervals from half cycle to half cycle.

As indicated for a complete cycle of voltage applied from a power source 54 as outlined in FIGURE 7, there can be voltage applied for less time as speed of the motor means increases though the voltage applied with such an increase of speed of the motor means can begin at a higher value of voltage along the half cycle of power from the source. Similarly, there can be a longer build up in reaching the peak of voltage for a larger portion of the cycle as more voltage is applied with decrease of motor means speed. Use of the computer-control unit or system in accordance with the present invention provides control of speed through a wide range of speeds on A.C.-induction motor means (single phase of polyphase A.C. machines). As indicated earlier, successful operation of the computer-control unit or system can be attained also by using only one SCR device or control rectifier means by replacing one of the two such devices with an adequate diode or regular rectifier means for satisfactory performance.

The computer-control unit or system in accordance with the present invention permits automatic sensing of vibration of the centrifugal load means 63 by way of a direct connection 96 to the second transformer means $T_2$ having the movable core 65 therewith. In accordance with positioning of this core portion 65 a signal is transmitted from the winding portions 64 to a second bridge means generally indicated by numeral 100 including suitable rectifier means 101, 102, 103 and 104 for transfer of signals to a capacitance means 105 which builds up a charge that is dissipated through a resistance means 108 series connected to permit passage of current through resistance means 78 for a voltage drop across the resistance means 78 representing a signal applied to the input terminals of the first semi-conductor means 80 in a manner similar to a signal applied from the speed sensing means as previously described. Functioning of the remainder of the circuit components in response to an input signal to the first semi-conductor means 80 is the same for a signal in response to vibration as for a signal in response to speed sensing means described earlier.

The Zener diode means 79 is provided for stabilization of input signal power to the semi-conductor means and a further Zener diode means 109 can be provided also for stabilization and regulation of such power signals relative to the semi-conductor means 90. This second Zener diode 109 can regulate a signal from a third bridge means generally indicated by numeral 110 including rectifiers 111, 112, 113 and 84. Signal from the third bridge means 110 is limited by an impedance or resistance means 115. A resistance means 116 can be provided for protection of the unijunction semi-conductor means 90. The third bridge means 110 is provided to establish timing and voltage signaling therefrom goes to zero as one or the other of the semi-conductor or SCR devices 93–94 fires and switches on-off in response to signaling from the speed sensing means and/or vibration sensing means as indicated earlier. The third bridge means 110, in effect, initiates oscillator operation to reset bias for the semi-conductor means in the computer-control unit.

The computer-control unit in accordance with the present invention permits variable speed controlling of an A.C.-induction motor means. The motor means such as 61 or 62 can have a two-pole or four-pole arrangement, respectively, for high and low speed operation. Thus, the computer-control unit or system can be used in combination with a single motor means as well as in combination with a pair of motor means made to function as a double A.C. motor drive having electronic control. The four-pole or tumble motor means 62 can operate over a relatively low speed range such as approximately 46 r.p.m. while for spinning operation a lower speed at an intermediate value of 135 r.p.m. and a higher speed at 525 r.p.m., for example, can be applied to a centrifugal load such as 63. Acceleration of the centrifugal load means 63 is controlled in a manner so that vibration of the load in a driven machine does not exceed a prescribed maximum subject to measures for effecting a balancing of the load means during operation. Such a balancing of the conditions can include a rearrangement of the load per se within a container or drum of the centrifugal device as well as a supplemental addition of weight such as by provision for adding liquid or other auxiliary weight means to the container around a periphery thereof. In place of actual weight means it would be possible also to provide some kind of magnetic forces and the like for balancing the centrifugal load container while speed thereof is limited pending correction of the unbalance condition before proceeding to accelerate to a higher speed operation. As long as the unbalance of the centrifugal load means exceeds correction capability, high speed spin operation is maintained at a speed below the maximum such as 525 r.p.m. consistent with the maximum machine vibration level. The centrifugal load container can be stopped if necessary for a pause during a part of the cycle of operation as such a stop would occur in the event the computer-control unit is used on a combination washer-dryer laundry equipment.

As indicated earlier, the four-pole tumble motor means 62 is mechanically connected to the higher speed two-pole spin motor means through an overrunning clutch means 95 which can have a suitable speed reduction ratio such as 4.6 to 1. This overrunning clutch means 95 permits the spin motor means 61 to have a rotor shaft that can run faster but not slower than that of the tumble motor means 62. Suitable mechanical connections such as a belt drive can be provided between the spin motor means and the container for the centrifugal load and this connection is represented by a line 120 in the representation of FIGURE 5. This connection 120 can also involve a speed reduction ratio such as 6.5 to 1, for example. Thus, the tumble motor means can drive the container of the centrifugal load through a 30 to 1 reduction until speed attains such a value that the spin motor means can take over for further acceleration of the centrifugal load means.

It is to be noted that the four-pole tumble motor means 62 can be provided with a centrifugal switching means therein and capacitance means of two values for use with the phase winding thereof. Except for an interruption or pause between washer and dryer phases of a cycle operation it is to be noted that the four-pole tumble motor means 62 can run continuously. One value of capacitance is used for obtaining greater phase shift for higher torque during motor starting operation and this capacitance is switched out or removed from the motor circuit per se in response to actuation of the centrifugal switch means therein. During tumble operation or low speed running of the motor means 62 the latter operates as a permanent capacitor motor using the second value of capacitance with the speed of the tumble motor means 62 controlled electronically by the computer-control unit to produce the lower speed for container movement as substantially 46 r.p.m. corresponding approximately to 1375 r.p.m. motor speed.

During spin operation, the electronic control and capacitor are removed from the tumble motor means connection to a differing connection such that the tumble motor means runs on the main winding only. This reconnection is established by the switching means 68–69 and at the point of removal of the direct electronic control to the tumble motor means there is an acceleration of the latter to its normal operating speed such as 1725 r.p.m. An important feature of the system is realized at this time as the tumble motor means 62 provides relatively high torque required to accelerate the load container and load therein to a container speed at which the load such as clothing can remain against an inner peripheral surface radially outwardly along the container of the load.

The two-pole spin motor means 61 has no centrifugal switch means but also uses two values of capacitance means in the phase winding circuit. The spin motor means 61 is energized at the beginning of a low spin operation with one value of capacitance means and accelerates the load container from 46 to 135 r.p.m., for example, at an intermediate speed range of approximately 890 r.p.m. motor speed. In this intermediate speed range the speed is maintained constant by electronic control of the computer-control unit in accordance with the present invention. As noted earlier, the low spin operation is aided by the tumble motor means 62 for approximately the first portion of the container speed change over a range of substantially 15 r.p.m. At the beginning of high speed spin operation the capacitance value used with the spin motor means 61 is changed and a machine vibration sensing device or speed discriminator means 51 dictates motor speed through the electronic computer-control unit in accordance with the present invention. With a balanced container load the speed of the container of a centrifugal load 63 can increase smoothly from 135 r.p.m. to the top speed of 525 r.p.m. thereof corresponding to the normal two-pole running motor speed of substantially 3450 r.p.m. In the event an unbalance exists such that container acceleration beyond a particular level would be in excess of desirable unbalance conditions, the acceleration of the centrifugal load container is decreased or even stopped and arrested at a speed which produces only permissible machine vibration. Gradually and concurrently this unbalance can be corrected by adding or removing suitable weight as a counterbalance and then the centrifugal load container speed can increase until once again a maximum speed is reached at which a limit for unbalancing signals occurs such that correction is necessary prior to permitting further increase in acceleration.

It is to be noted that a computer-control unit or system in accordance with the present invention can have provision for sensing any parameter of interest such as temperature, light, vibration, humidity, degree of cleanliness and the like. The examples of speed sensing means and vibration sensing means are provided in the illustration of FIGURE 5 since these variable conditions are most generally encountered particularly for higher speed spinning of centrifugal load containers. It is to be noted that actually the heavier A.C. induction motor means is used as the tumble motor means with speed and voltage control up to a distribution speed for a shiftable centrifugal load in a container. Beyond a predetermined distribution speed it is possible to use a more lightly constructed high speed motor for spinning operation. Thus, basically one motor means such as the tumble motor means 62 carries the centrifugal load during low speed or tumble operation while both motors can operate and contribute to driving of the load during low speed spin operation in a transition. For high speed operation involving spinning the motor means 61 can provide the driving force for the centrifugal load container as permitted by the overrunning clutch means 95. Features of the present invention can be used for any spinning apparatus such as used during sugar refining, centrifuging or separation of load materials having differing weights as well as during washer-dryer appliance functioning.

Previously, considerable difficulty was encountered in any attempts to provide manual speed control for an A.C. induction motor. Stability in such speed control of an A.C. motor could be achieved only with feedback but now a servo control can be provided for electronically holding and controlling speed of operation in accordance with voltage applied to an A.C.-induction motor means. It is possible to use the computer-control unit in accordance with the present invention for A.C. voltages at high as well as low values thereof. Acceleration of the motor means can occur only as permitted by a semi-conductor control circuit in combination with the centrifugal load device up to a time limit which can be governed by a suitable timer in accordance with the balance condition sensed. The subject computer-control unit can be used with polyphase as well as single phase motor means and variable frequency can also be used for control of one of the two motors.

The computer-control unit having semi-conductor means in accordance with the present invention for control of voltage applied to motor means for governing speed thereof can eliminate mechanical switching and can be provided in a compact package installed on an appliance or other centrifuging device. Industrial machines can be fitted with such an electronic computer-control unit and winding machines as well as fabric slitting devices can be controlled as to speed of operation thereof in accordance with voltage supplied to the motor means for driving the same. During slitting of fabrics such as paper and cellulose materials factors of temperature and humidity can become a factor to be considered and accordingly, sensing means for such conditions can be provided to have signals therefrom fed to the computer-control unit having semi-conductor means triggered to effect on-off operation of silicon controlled rectifier devices such as 93–94. In addition to the centrifugal load containers it is thus possible to operate motor means for other machine operation including, for example, pump means or ventilating fans where fluid pressure or velocity of output flow can be subjected to sensing for conversion into signals to the semi-conductor means of the computer-control unit.

It is to be understood that features of the present invention can be used for not only control of speed but also control of torque by varying voltage. A constant torque can be held up to a constant speed. Furthermore, control of single phase as well as polyphase machines can be accomplished with features of the present invention.

Figure 8:
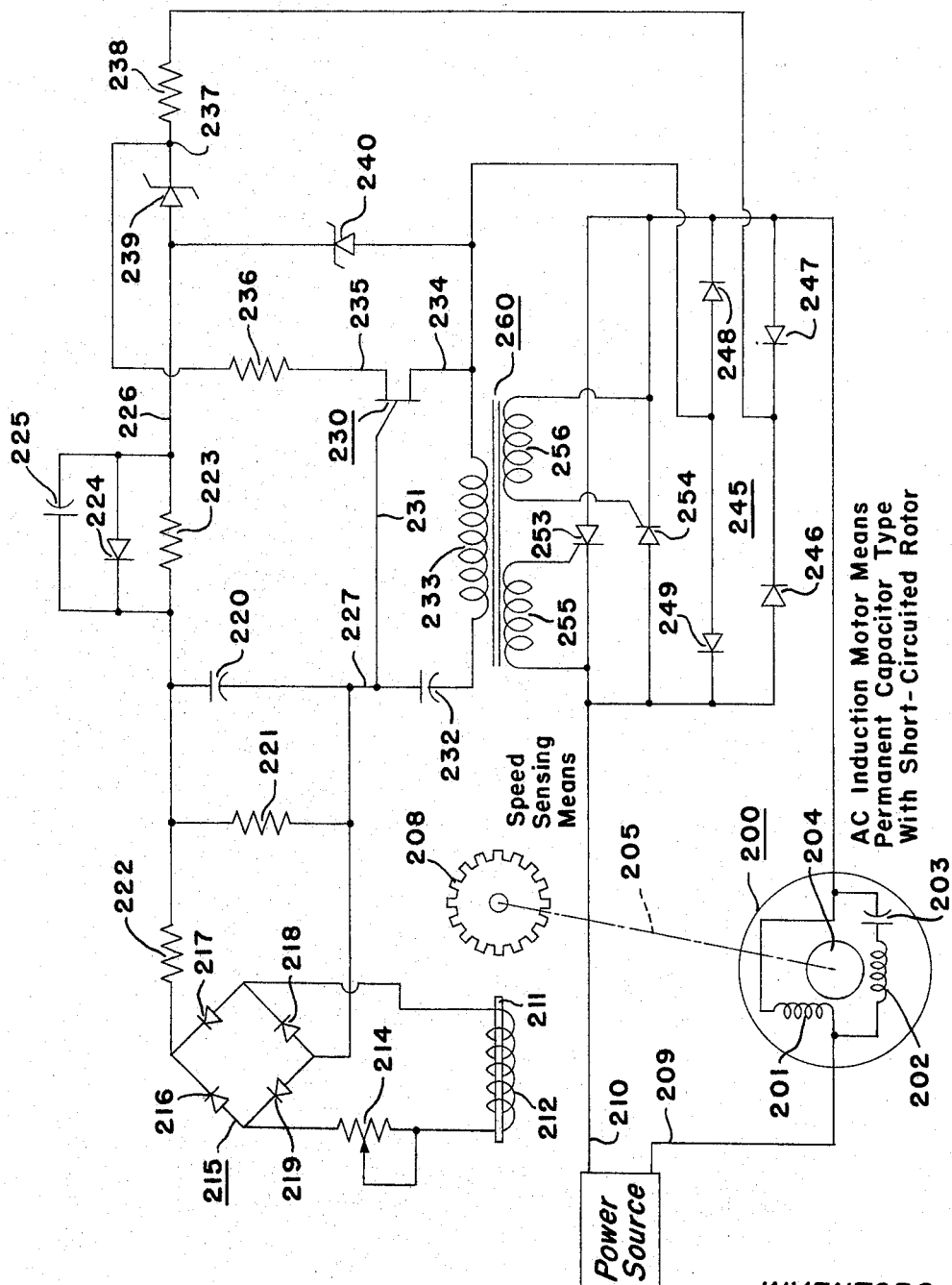
FIGURE 8 shows circuitry similar to that of FIGURE 5 for operation in accordance with the present invention.

FIGURE 8 illustrates circuitry for a speed control unit similar to that of FIGURE 5 with revision in the number of components utilized. The control unit of FIGURE 8 is shown in combination with an A.C. induction motor means generally indicated by numeral 200 having a primary stator or main winding portion 201 as well as a secondary stator or phase winding portion 202 in series with permanent capacitor means 203. A short-circuited rotor portion 204 similar to that designated by references 43–44 in FIGURE 4 is journaled in a well known manner as to the wound stator including portions 201 and 202. The short-circuited rotor portion includes an extended shaft means 205 carrying a toothed wheel means 208 similar to that designated by references 48 and 58 in FIGURES 4 and 5 respectively. As the toothed wheel means 208 rotates with variation in speed for example, a condition sensing operation occurs in a closed loop configuration by way of the control unit or computor circuitry for infinite electronic speed-torque control of the A.C.-induction motor means 200 whereby power or voltage supplied by lines 209 and 210 is metered effectively for desired motor operation.

Figure 9:
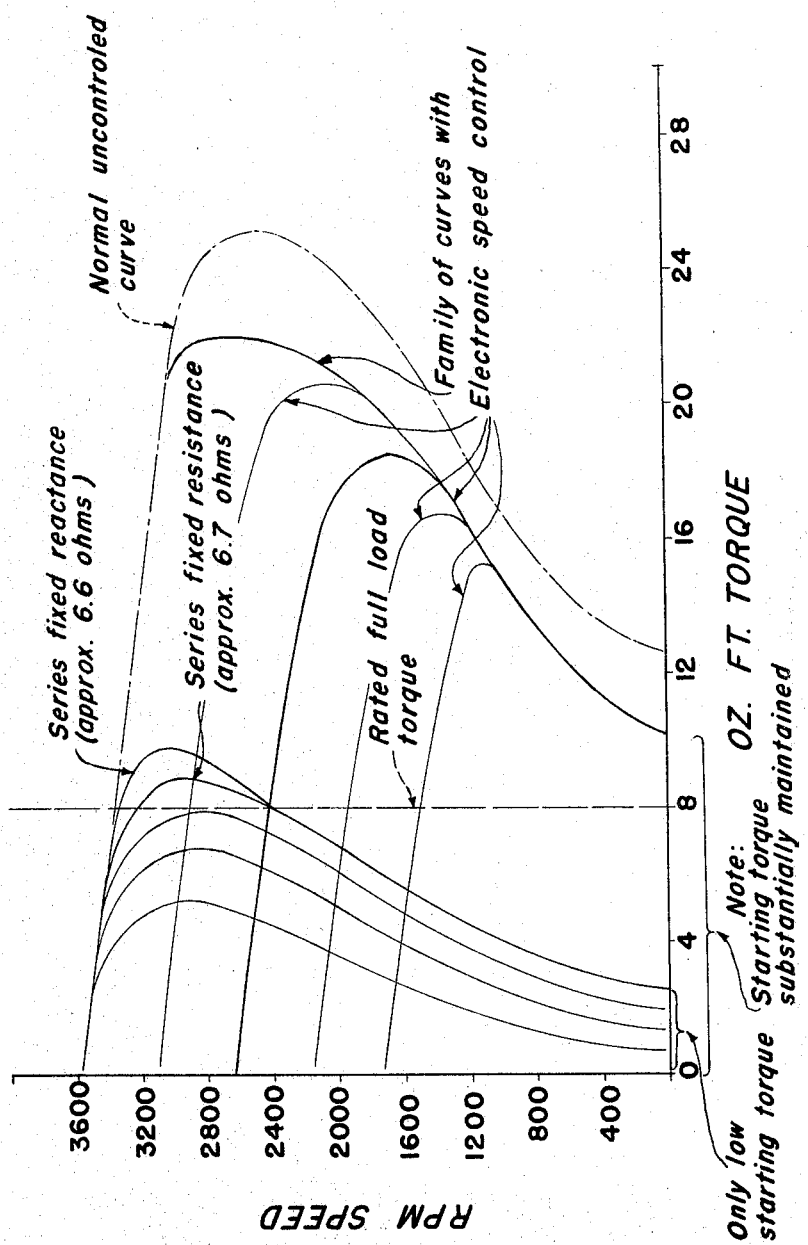
FIGURE 9 illustrates a graphical comparison of speed-torque curves of various control methods as well as electronic speed control of A.C.-induction motor means.

The condition sensing operation includes the toothed wheel means 208 and a permanent magnet pickup means 211 having a number of turns of wire 212 wound therewith for transfer of signalling of differing voltage induced due to variation in rate of change of air gaps and magnetic flux as the toothed wheel means rotates in a location radially in alignment with the permanent magnet pickup means 211 comparable to pickup means designated by references 49 and 56 in FIGURES 4 and 5 respectively. Condition-sensing signals of voltage from the pickup means 211 and wire 212 pass by way of a series-connected calibrating potentiometer 214 to a full-wave rectifier bridge means generally indicated by numeral 215 including rectifier portions 216, 217, 218 and 219 therewith for conversion of A.C. signal voltage from the coil or wiring 212 of the condition sensing operation into full-wave direct current that is filtered by a capacitance means 220 connected in parallel with a stabilizing resistance or impedance 221. A series resistance or choke impedance 222 is provided between the bridge means 215 at a juncture between rectifiers 216 and 217 as well as a juncture between capacitance 220 and impedance 221. Further filtering for signal control is provided by a series-connected tank component including a resistance 223, rectifier 224 and capacitance 225 as shown in FIGURE 8. Variable output signalling as filtered from said sensing operation passes by connections 226 and 227 to computer-control unit components including a unijunction semi-conductor means generally indicated by numeral 230, having a lead 231 therefrom to connection 227 at a junction with capacitance means 232 which is in series with a transformer primary portion 233 connected at an opposite end with a further lead 234 of the unijunction semi-conductor means 130. Another lead 235 of the unijunction semi-conductor means 230 is connected to a resistance or impedance means 236 joined at an opposite end to a juncture 237 between resistance or impedance means 238 and a Zener diode means 239. A further Zener diode means 240 is connected between the transformer primary portion 233 and the other Zener diode means 239. The resistance or impedance means 236 and 238 in conjunction with Zener diode means 239 and 240 regulate voltage signals between the unijunction semi-conductor means 230 and a further rectifier bridge means 245 having rectifiers 246, 247, 248 and 249. This bridge means 245 of circuitry in FIGURE 8 is comparable to bridge means 210 of circuitry in FIGURE 5, respectively, serving similar functions. A pair of back-to-back connected semi-conductor or SCR devices generally indicated by numerals 253 and 254 in FIGURE 8 are comparable in function to semi-conductor devices 93 and 94 respectively in FIGURE 5. Secondary transformer portions 255 and 256 are also connected with these semi-conductor means. The transformer portions are collectively identified by reference numeral 260 and function as previously described for a similar component in the circuitry of FIGURE 5. FIGURE 9 provides graphic showing of comparison of speed-torque curves of various control methods for a typical permanent capacitor A.C.-induction motor means under normal uncontrolled conditions, under fixed resistance and fixed reactance voltage control, and under electronic speed control in accordance with the present invention. The resistance and reactance voltage control can effect reduction of total voltage at motor terminals with a resulting speed torque curve with much reduced starting and breakdown torque capability. Such a characteristic is suitable only for an application as for a fan motor where the torque required reduces very rapidly with speed and even then there is poor speed stability at speeds below breakdown torque.

In accordance with the present invention, voltage supplied to the A.C. induction motor is controlled on the basis of each half cycle. This voltage control is established on a basis of motor speed. Therefore, at starting the motor is supplied with substantially full voltage in accordance with illustration of FIGURE 7 so that higher motor starting capability can be retained. Then speed can be set at an operating point along torque demand value setting and the electronic control will feed the A.C. induction motor adequate voltage to operate at this point while retaining most of the break-down torque characteristic. Minimum speed point of operation on the rated full load torque line is thus established by motor cooling capabilities and not the voltage control parameters as is the case with the fixed resistance and reactance voltage control. Improved regulated voltage control is accomplished electronically as based upon a closed loop reference voltage which is directly proportional to A.C. induction motor speed. With this reference voltage, it is possible to operate on any speed operating point within the limitations of the motor and control components by controlling the output of the reference voltage.

In that the reference voltage is zero during starting, the silicon controlled rectifier fires very early in the voltage cycle and therefore a major portion of motor starting torque is maintained. As the motor speeds up, the reference voltage becomes increasingly greater until reaching the control setting position at which time the silicon controlled rectifier is firing much later in the voltage cycle and the motor windings are receiving a controlled voltage on the basis of each half voltage cycle. Thus collectively voltage variation of such control at each voltage half cycle results in integration of signals to permit speed control of an A.C. induction motor means previously troublesome and difficult to achieve. Now a short-circuited wound rotor or cast squirrel cage rotor winding means of an A.C. induction or synchronous-type motor can be controlled with good regulation whereas previously variation in speed thereof met with difficulty in operation due to dependence upon fixed poles and frequency. A closed loop system such as with speed sensing or tachometer pickup of speed signalling permits precise speed regulation regardless of load and torque requirements. Switching problems are avoided. Control of voltage controls torque with an integration to operate anywhere along the electronic speed control curve with infinite range of available maintained speed control. Though similar curve characteristics are obtainable with use of a rheostat for other types of motors the present invention achieves new and unexpected results specifically for an A.C. induction motor means having a short-circuited wound or cast rotor component.

The features of the present invention can be applied also for two or more motor systems going at a time subject to one electronic control circuit therewith. Such an arrangement could involve for example a motor-compressor means and fan or blower motor with the latter subject to running under high slip conditions due to reduced voltage available. The features of the present invention permit use of the static controlled system which can continue to deliver rated torque at speeds otherwise below breakdown as illustrated in FIGURE 9. For example, previous operation at 2200 r.p.m. would result in breakdown and stalling of the motor whereas an A.C. induction motor controlled in accordance with the teaching of the present invention is capable of continuing to deliver the torque requirements at this speed subject only to considerations of provision for cooling the motor. This is particularly advantageous where control of a condition of temperature for example on an air conditioner or on a furnace is combined with A.C.-induction motor means operation. Thus bonnet temperature can be sensed with a constant running blower speed even on climate control installations of a furnace with central air conditioning. Also the features of the present invention can be applied to a dehumidifier means. At least one variable parameter or variable condition is thus sensed for speed control to effect variation in energizing voltage for an A.C.-induction motor means stator winding portion. The features of the present invention are particularly advantageous for operation of an A.C.-induction motor having a short-circuited rotor and the problems resolved are entirely different from those where a wound rotor is provided to be variously energized and entirely different from universal motor means and direct current motors where variation in speed and torque control is known.

While the embodiments of the present invention as herein disclosed constitute preferred forms, it is to be understood that other forms might be adopted.

What is claimed is as follows:

1. In an A.C.-induction motor control arrangement including a voltage source and an A.C.-induction motor means energizable therefrom, sensing means for at least one condition of operation of said A.C.-induction motor means as an electrical signalling, amplifier means for transfer of said signalling from said sensing means, the combination therewith comprising, semi-conductor static integrating control circuitry between said amplifier means and said A.C.-induction motor means, said static integrating control circuitry including silicon-control rectifier means gated from said amplifier means in proportion to said signalling whereby power supply from said voltage source is increased in response to decrease of signalling resulting from said sensing means as to condition of operation and thereby power supply from said voltage source is decreased in response to increase of signalling resulting from said sensing means as to condition of operation of said A.C.-induction motor means, and reset bias means for repetition of control of said rectifier means.

2. The combination of claim 1 wherein said voltage source for power supply provides a full wave range of triggering for gating said silicon-control rectifier means for a relatively longer time interval of conductivity thereof which results in increased speed as the condition of operation sought by said sensing means so that said static integrating control circuitry effects comparable chopping of wave form of said voltage source by gate and reset bias control of said silicon-control rectifier means specifically for a relatively shorter on time interval of conductivity of said silicon-control rectifier means which results in decreased speed as the condition of operation of said A.C.-induction motor means.

3. The combination of claim 1 wherein said amplifier means includes a transformer means for gating to said static integrating control circuitry including a pair of silicon-control rectifier means in back-to-back connection with said A.C.-induction motor means which operates over a variable speed range modulated between full wave and less than full wave energy supply from said voltage source through said back-to-back pair of silicon-control rectifier means in response to closed loop condition sensing with said A.C.-induction motor means per se.

4. The motor control arrangement according to claim 1 wherein said silicon-control rectifier means is gated from a triggering circuit connected with the gate of said silicon-control rectifier means for supplying turn-on pulses to said silicon-control rectifier means, said triggering circuit having a power input circuit connected with said voltage source, and wherein said reset bias means comprises a circuit arrangement where the anode-cathode circuit of said silicon-control rectifier means is connected across said power input circuit whereby said silicon-control rectifier means shunts the input to said triggering circuit when it is conductive.

5. The motor control arrangement according to claim 1 wherein said silicon-control rectifier means is gated by a pulse forming control circuit connected with the gate electrode of said silicon-control rectifier means for supplying turn-on pulses to said silicon-control rectifier means and wherein said reset bias means comprises a circuit arrangement including a further rectifier means connected with said source of voltage and pulse forming control circuit for supplying power to said pulse forming control circuit, said circuit arrangement being such that the anode-cathode circuit of said silicon-control rectifier means is connected across said further rectifier means.

6. In combination, an A.C.-induction motor means having a short-circuited rotor portion, semi-conductor switch means having power supply connection with said A.C.-induction motor means, a sensing means for deriving a control voltage responsive to a condition affecting operation of said A.C.-induction motor means, semi-conductor means as well as diode bridge means that transfer signalling proportional to control voltage, and trigger as well as reset bias means dependent upon said control voltage for controlling conductivity of said semi-conductor switch means there being predetermined variation in speed-torque characteristic of said A.C.-induction motor means having the short-circuited rotor portion.

7. The combination of claim 6 wherein said semi-conductor switch means is a controlled rectifier and where a triggering circuit is connected with the gate of said controlled rectifier for supplying turn-on pulses to said gate and where said reset bias means comprises a circuit arrangement where the input of said triggering circuit is connected across the anode and cathode of said controlled rectifier whereby said input receives power from said source of voltage when said controlled rectifier is non-conductive and is shunted by said controlled rectifier when it is conductive.

8. The combination of claim 6 wherein said A.C.-induction motor means has substantially full voltage supplied thereto due to said sources of said reset bias and trigger signalling for controlling conductivity of said semi-conductor switch means during starting for greater torque than with impedance starting which reduces total voltage for less torque particularly during starting though now still retaining most of breakdown torque characteristic.

9. The combination of claim 8 wherein minimum speed point of operation for rated full load torque value is established by motor cooling capabilities rather than voltage control components as with fixed impedance starting.

10. In combination, A.C.-induction motor means having a short-circuited rotor portion as well as main and phase stator winding means with fixed capacitor means, semi-conductor switch means having power supply connection to said A.C.-induction motor stator winding means, sensing means for deriving a control voltage responsive to the speed of said short-circuited rotor portion of said A.C.-induction motor means, and means including sources of reset bias and trigger signalling for controlling conductivity of said semi-conductor switch means in proportion to variable speed operation of said A.C.-induction motor means having said short-circuited rotor portion, said control voltage deriving means including a magnetic type speed pickup and means for varying air gap thereto carried by a rotor shaft extension, said A.C.-induction motor means as well as pickup and means for varying air gap being within hermetically sealed housing structure.

11. A machine control system, comprising, in combination, an A.C.-induction motor means having an energizable stator winding portion and a short-circuited rotor portion, a voltage power source, back-to-back connected semi-conductor control rectifier means provided between said source and said A.C.-induction motor means, condition sensing means for deriving a signalling that determines biasing of said control rectifier means for voltage control based on each one half cycle from said power source so that at starting substantially full voltage is applied through said rectifier means to said A.C.-induction motor means, said A.C.-induction motor means being subject to speed variation due to voltage control applied through said rectifier means regardless of said short-circuited rotor portion, first rectifier bridge means and a filter network connected to receive variable signalling from said condition sensing means, unijunction semi-conductor means and transformer means being provided together with resistance and Zener diode means for regulation of triggering of said control rectifier means, and a further rectifier bridge means connected between said control rectifier means as well as resistance and Zener diode means for transfer of voltage for initiating oscillator operation to reset bias for semi-conductor means control.

12. A static integrating control circuitry for use with electrically motorized equipment and having semi-conductor circuit means with components, comprising, a source of electrical power, motor means of said equipment energizable from said source to drive a centrifugal load, vibration sensing means having a movable core and transformer means for translation of mechanical vibratory movement of the centrifugal load into electrical signals transmitted to first bridge means for signal rectification having circuit connection to input terminals of semi-conductor means, speed sensing means having a toothed member which effects air gap variation to a permanent magnet core located axially as a pickup for an electromagnetic coil for transfer of variable pulses to second bridge means for signal rectification also having circuit connection to input terminals of said semi-conductor means, impedance electrically interconnected to have predetermined values of resistance, inductance and capacitance means supplied with power through output terminals of said semi-conductor means, transformer means for gate pulse signalling to at least one silicon-control rectifier device for switching said source of power to apply energy to said motor means for at least a portion of a half-cycle of power, and a third rectifier bridge means to transfer signal from said silicon-control rectifier device for resetting bias of said semi-conductor means, said silicon-control rectifier device as triggered by said semiconductor means gated signals effecting variable speed controlling of at least one A.C.-induction motor means.

References Cited by the Examiner

UNITED STATES PATENTS

| | | | |
|---|---|---|---|
| 2,876,406 | 3/1959 | Charbonneaux | 318—227 |
| 3,110,853 | 12/1963 | Jones | 318—328 |
| 3,119,055 | 1/1964 | Martin | 318—452 |

OTHER REFERENCES

Silicon Controlled Rectifier Manual, General Electric Company, First edition, pp. 5, 86–93.

Publication: Controlled Rectifiers Drive A.C. and D.C. Motors, W. R. Seegmiller, Electronics, 11–13–59.

ORIS L. RADER, *Primary Examiner.*

JOHN F. COUCH, *Examiner.*

G. Z. RUBINSON, *Assistant Examiner.*